(12) United States Patent
Sepulveda Villalobos et al.

(10) Patent No.: US 9,849,460 B2
(45) Date of Patent: Dec. 26, 2017

(54) DIRECT VISUAL MONITORING METHOD AND SYSTEM FOR SENSING THE INTERIOR OF A ROTARY MINERAL MILL

(75) Inventors: German Arnaldo Sepulveda Villalobos, Vina del Mar (CL); Javier Alejandro Venegas Requena, Valparaiso (CL); Ennio Carlo Perelli Bacigalupo, Concon (CL); Sebastian Jose Nova Vega, Vina del Mar (CL); Alfredo Alejandro Bruce, Concon (CL); Rodrigo Antonio Riquelme Hormazabal, Valparaiso (CL); Rodrigo Edgardo Pozo Escobar, San Fernando (CL)

(73) Assignee: Sociedad De Innovacion Y Transferencia Tecnologica Limitada, Vina del Mar (CL)

( * ) Notice: Subject to any disclaimer, the term of this patent is extended or adjusted under 35 U.S.C. 154(b) by 738 days.

(21) Appl. No.: 14/357,529

(22) PCT Filed: Nov. 10, 2011

(86) PCT No.: PCT/CL2011/000069
§ 371 (c)(1),
(2), (4) Date: May 9, 2014

(87) PCT Pub. No.: WO2013/067651
PCT Pub. Date: May 16, 2013

(65) Prior Publication Data
US 2014/0338474 A1 Nov. 20, 2014

(51) Int. Cl.
*B02C 23/02* (2006.01)
*H04N 5/225* (2006.01)
(Continued)

(52) U.S. Cl.
CPC .......... *B02C 17/1805* (2013.01); *G01K 13/00* (2013.01); *B02C 17/183* (2013.01);
(Continued)

(58) Field of Classification Search
CPC ............. G01N 2291/015; G01N 29/14; G01N 29/4436; G01N 29/46; G01C 11/00;
(Continued)

(56) References Cited

U.S. PATENT DOCUMENTS

| 4,722,485 A | 2/1988 | Young et al. |
| 4,940,594 A * | 7/1990 | Van Alstine ............. A23G 4/04 426/231 |

(Continued)

FOREIGN PATENT DOCUMENTS

| CL | 2010000402 A | 4/2010 |
| CN | 101745449 A | 6/2010 |

(Continued)

*Primary Examiner* — Randy Gibson
*Assistant Examiner* — Gedeon M Kidanu
(74) *Attorney, Agent, or Firm* — Muncy, Geissler, Olds & Lowe, P.C.

(57) ABSTRACT

A direct visual monitoring system for sensing the interior of a rotary mineral mill which comprises a monitoring unit, a main control unit and an operation and management unit wherein the monitoring unit is located inside a feed hopper and adjusted according to the physical characteristics of said feed hopper and in accordance with the dimensions of the mill, so as to allow for a direct view of the interior of the mill. The operating method comprises arranging inside a monitoring unit, a container of sensors for sensing the inner temperature thereof; determining the acceleration on the vertical axis, on the horizontal lateral axis and on the front horizontal axis, according to the time; obtaining two-dimensional images of the geometric conditions of the interior of the mill; obtaining two-dimensional thermal images of the (Continued)

interior of the mill and executing a detection of distance in one or more planes.

10 Claims, 5 Drawing Sheets

(51) Int. Cl.
    *G01C 15/00*     (2006.01)
    *B02C 17/18*     (2006.01)
    *G01K 13/00*     (2006.01)
    *H04N 7/18*     (2006.01)

(52) U.S. Cl.
    CPC .......... *B02C 23/02* (2013.01); *B02C 2210/01* (2013.01); *G01C 15/002* (2013.01); *H04N 5/2252* (2013.01); *H04N 7/183* (2013.01)

(58) Field of Classification Search
    CPC ... G01C 11/02; G01C 15/002; B02C 17/1805; B02C 25/00; G01L 311/002
    See application file for complete search history.

(56) References Cited

U.S. PATENT DOCUMENTS

| | | | |
|---|---|---|---|
| 5,057,211 A * | 10/1991 | Baummer | B03B 5/02 209/448 |
| 5,987,966 A | 11/1999 | Fontanille et al. | |
| 6,690,016 B1 * | 2/2004 | Watkins | G01N 25/72 250/341.1 |
| 7,783,376 B2 * | 8/2010 | Marsh | G01C 11/02 356/3 |
| 8,230,738 B2 * | 7/2012 | Radziszewski | B02C 17/1805 73/489 |
| 2004/0255680 A1 * | 12/2004 | Ortega | B02C 17/1805 73/649 |
| 2005/0006419 A1 * | 1/2005 | Farmwald | G05D 7/0605 222/544 |
| 2007/0143989 A1 * | 6/2007 | Polsonetti | B22F 3/003 29/730 |
| 2007/0163505 A1 * | 7/2007 | Lynch | A01K 39/012 119/52.1 |
| 2008/0097723 A1 * | 4/2008 | Pontt Olivares | B02C 17/1805 702/182 |
| 2010/0091103 A1 * | 4/2010 | Peltonen | B02C 21/02 348/82 |
| 2010/0237289 A1 * | 9/2010 | Self | A61L 11/00 252/373 |
| 2012/0257049 A1 * | 10/2012 | Schnell | H04N 5/33 348/135 |
| 2017/0142302 A1 * | 5/2017 | Shaw | H04N 5/2252 |

FOREIGN PATENT DOCUMENTS

| | | |
|---|---|---|
| ES | 8704759 A1 | 7/1987 |
| ES | 2147905 T3 | 10/2000 |
| GB | 2278789 A | 12/1994 |
| WO | WO 2007/101319 A1 | 9/2007 |
| WO | WO 2007/124528 A1 | 11/2007 |
| WO | WO 2008/009133 A1 | 1/2008 |

* cited by examiner

DIRECT VISUAL MONITORING METHOD AND SYSTEM FOR SENSING THE INTERIOR OF A ROTARY MINERAL MILL

FIELD OF THE INVENTION

The present invention relates to an in-line monitoring system and method for obtaining direct data inside of a rotary mineral mill or the like, by means of a direct visualization of the direct load and the inner liner of said mill.

More specifically relates to a direct visual monitoring system and method of the inside of a mill.

BACKGROUND OF THE INVENTION

Currently, the tools that are used when operating inside a mill, in order to determine some data about the behavior of certain key parameters are indirect tools, inferences provided by mathematical models and/or external sensors to the mill which provide supposed data about the optimal levels of load, wear of materials, as well as of liners and efficiency in using grinding means.

Such information is not more than just estimates and inferences when considering the lack of concrete tools showing what is really happening inside the mill during operation.

The operational environment of a grinding mill is produced by impact, attrition and abrasion when the mill rotates at a speed between the range of 60 to 85% of its critical speed.

Nowadays it is not possible to know first-hand what is happening inside a mill while this is operating. It can only be inferred the behavior and condition of the load, considering that the great technological barrier is the aggressiveness of the environment inside the mill, such as a SAG mill.

Currently, there have been some attempts to obtain an image from the inside of the mill. The patent application CN101745449A dated 23 Jun. 2010 entitled "Ball mill with capacity to monitor movement in the internal environment" property of YI SUN et al, discloses a camera with a fixed structure in the interior of the ball mill, and is connected to a protective cover. The structure is balanced against clockwise motion so that the structure is isolated from rotation. This makes possible to monitor the behavior of the load in real time. However, this is not positioned in a safe zone, which means that structure must be replaced once it is worn out. This results in the ball mill to be stopped. In addition, the camera does not collect other parameters such as the actual wear, alerts when in presence of detachments of a piece, the absolute position of the load, among other variables.

The Chilean Application 201000402 dated 23 Apr. 2010 entitled "Grinding Ball having the property of transmitting information about its behavior inside the grinding towards an external receiving point", Property of L. Cerda et al, discloses a grinding body which is incorporated into the load of a SAG mill and which in its interior is provided with a sensor, a microprocessor, a receiver and a transmitter which captures data relative to the behavior of said grinding body being in contact with the grinding and the mill, thereby processing, translating and transmitting said information from and towards an external receiver located on the surrounding space with respect to the grinding body. The grinding body works in the interior of the load and has a sole undefined sensor. However, it does not provide optical information, wear rate, alert in case of a loose piece of the liner, the apparent volumetric filling level and other parameters such as the ones proposed by the present application.

BRIEF DESCRIPTION OF THE INVENTION

The present invention discloses an in-line system and method for monitoring the operation inside a rotary mineral mill, for instance, a SAG mill, by means of an optical and/or geometric scanning for the obtaining of direct data about the functioning of the interior of the mill.

More particularly an optical and/or geometric monitoring system inside of a rotary mineral mill and its operation method.

The invention allows for the in-line direct measurement and transmission of variables describing the status and the operation inside the grinding chamber of a mill.

The optical and/or geometric monitoring system comprises an optical and/or geometric monitoring unit which is located in a safe zone having a direct visualization of the interior of the mill, which prevents the risk of a destructive damage to the instruments inside this optical and/or geometric monitoring unit.

In addition, the system has a logical platform with software and firmware for the processing and submission of the data to the user in the control of the operation.

The system allows measuring variables such as the actual wear rate and geometric profile of the wear of each liner piece, detachment of a liner piece, apparent volumetric filling level and the absolute position of the load when the SAG mill is in movement, inspected filling level during the stops, approximate indication of the projection frequency of load in cataract movement, occurrence of the packaging of load between the lifters and a three-dimensional map of the liner of the mill as well as its load during operation, among others.

Therefore, a first objective of the invention is providing a direct visual monitoring system for sensing the interior of a rotary mineral mill or the like which comprises a monitoring unit, a main control unit and an operation and management unit wherein the monitoring unit is located inside a feed hopper by means of which the mill is fed from a container and the location of the monitoring unit inside the feed hopper is adjusted according to the physical characteristics of said feed hopper and in accordance with the dimensions of the mill, so as to allow for a direct view of the interior of the mill.

Wherein the monitoring unit is subject to vibrations during the loading of the mill, which determines along with the aggressive environment of the load passing below the monitoring unit, a protection for its operation which comprises an outer housing having a defined shape given by the volume occupied inside the feed hopper and protects a container of sensors which are visually oriented towards the inside of the mill.

The outer housing is built as a steel shield having a high degree of hardness also, in order to absorb any kind of impact it has a rubber lining and for absorbing the vibrations it also has passive low frequency shock absorbers and optionally active shock absorbers can be also used.

In addition, the container of sensors which are visually oriented towards the inside of the mill, comprises sensor means arranged in said container of sensors, comprising a vessel which in its interior is composed by a laser scanner, a thermographic camera, a digital camera, a plurality of illumination means, a thermocouple and an accelerometer; and the container of sensors has a face oriented towards the interior of the mill, which is a display panel containing perforations with the shape of each element or sensor which are left at a surface level, thus, the laser scanner has a scanner opening, the thermographic camera is associated to a thermal opening, the digital camera has an opening and along this photographic camera is located an illumination opening wherein the illumination opening is defined by the arrangement being adopted when the digital camera is calibrated for a better visual approach towards the inside of the mill, with which the illumination means can be arranged at a side, below, above or surrounding the digital camera.

The display panel has in its upper part a visor which is hollow and that is integrated into the container of sensors which is internally connected to a clean air duct under pressure wherein the air injected by the air duct under pressure, flows through the visor and exits by a plurality of orifices, thereby generating a plurality of air jets flowing from the top of the visor towards the bottom, maintaining the external face of the display panel clean and preventing the material of different sensors and illumination means from being embed.

A second objective of this invention is providing an operational method of the direct visual monitoring system for sensing the interior of a mill, which comprises the arrangement of a monitoring unit for the direct visual monitoring in order to sense the interior of a mill, wherein the monitoring unit contains in its interior a container of sensors which allow: sensing the inner temperature of said mill by means of a thermocouple: determining the acceleration on the vertical axis, on the horizontal lateral axis and on the front horizontal axis based on time, by means of an accelerometer; obtaining two-dimensional images of the interior of the mill by means of a digital camera with regard to the geometric conditions of the interior of the mill, obtaining two-dimensional images of the interior of the mill in relation to the thermal spectrum by means of a thermographic camera, thereby getting thermal images of the interior of the mill; and executing a detection of distance in one or more planes by means of the detection of distances, for instance, detection of the time of flight by using laser beams through a laser scanner for obtaining one of more three-dimensional geometric profiles of the surrounding in predefined angle positions of the interior of the mill.

DETAILED DESCRIPTION OF THE INVENTION

Figure 1:
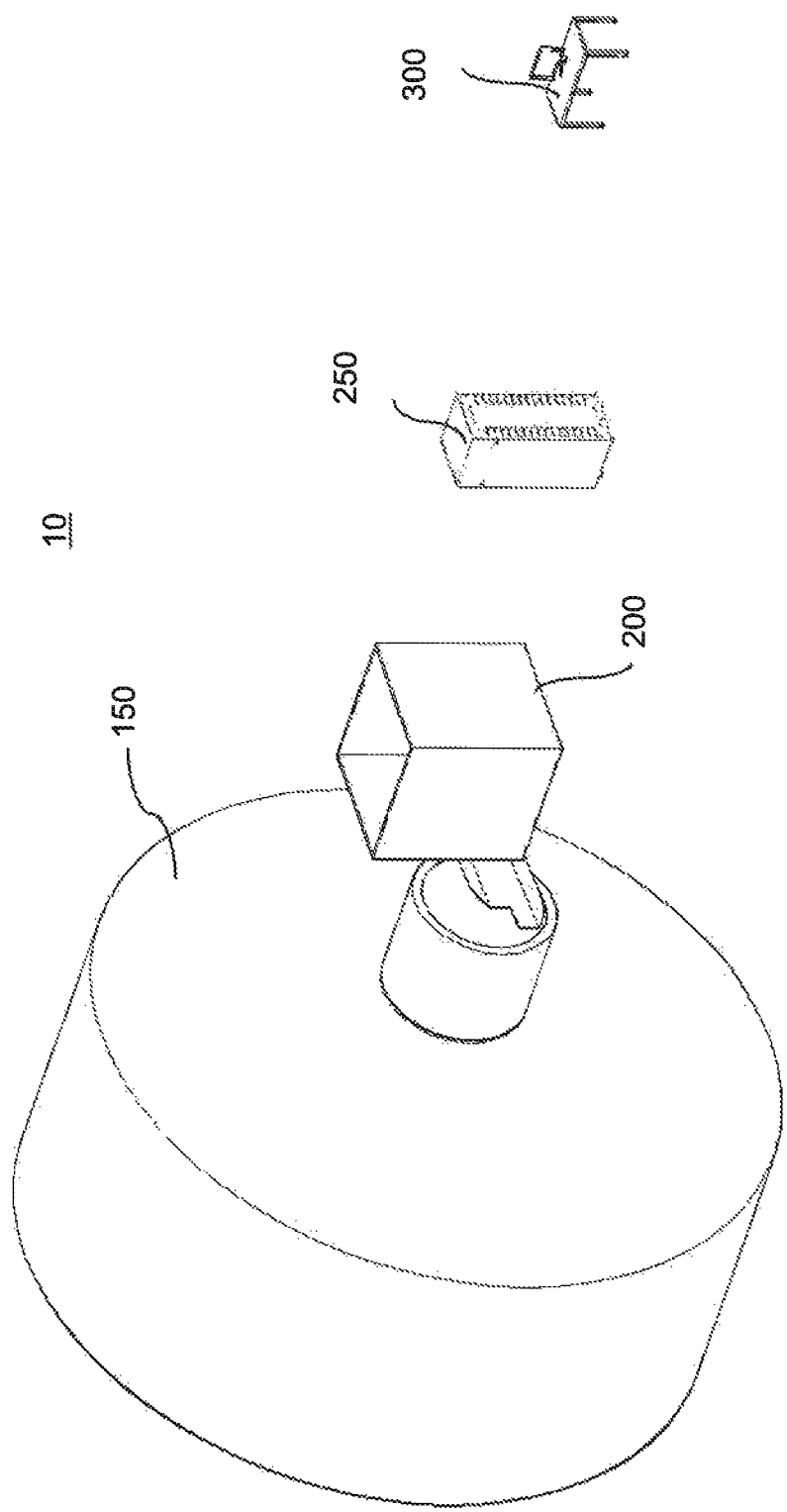
FIG. 1 shows a perspective view of a rotary mineral mill according to the present invention.

The present invention is described as a direct visual monitoring system of the interior of a mill (10) which comprises a monitoring unit (240), a main control unit (250) and an operation and management unit (300) as shown in FIG. 1.

Figure 2:
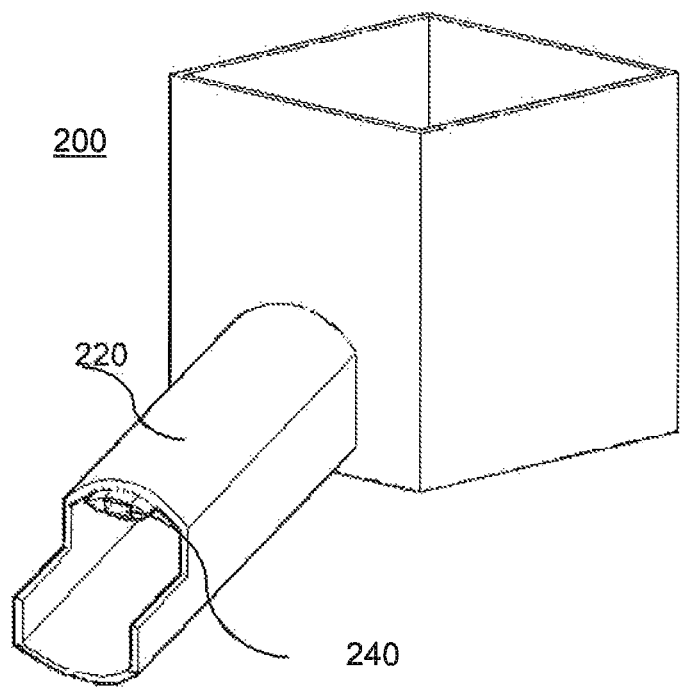
FIG. 2 shows a perspective view of the feed hopper (chute) showing the location zone of the optical and/or geometric monitoring unit.

The monitoring unit (240) is located inside a feed hopper (220) to feed mineral into the mill (150); the location of the monitoring unit (240) inside the feed hopper (220) is adjusted according to the physical characteristics of the feed hopper (220) and in accordance with the dimensions of the mill (150) in such a way to allow a direct view of the interior of the mill (150) as shown in FIG. 2.

The feed hopper (220) is a feeder for the load of the mill (150) from the vessel (200), and the monitoring unit (240) is subject to vibrations during the loading of the mill (150). The monitoring unit (240) determines along with the aggressive environment of the load passing below the monitoring unit (240) an adequate protection for its operation.

Figure 3:
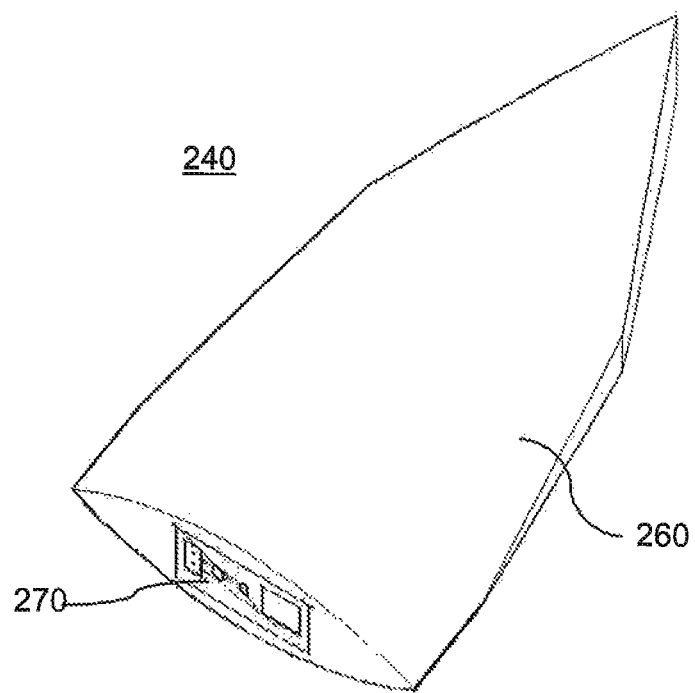
FIG. 3 shows an isometric view of the optical and/or geometric monitoring unit.

The monitoring unit (240) comprises an outer housing (260) having a defined shape given by the volume occupied inside a feed hopper (220) and protects a container of sensors (270) being visually oriented towards the interior of the mill, as shown in FIG. 3.

The outer housing (260) is subject to the irregular passage of the mineral entering the mill (150) at a high speed, the periodical entering of the grinding balls, high pressure water injection which can generate corrosion in the feed hopper (220), suspended fine material and vibrations in the feed hopper (220) due to the displacement of the mineral. All of the aforementioned cause the outer housing (260) to be built as steel shielding with a high degree of hardness.

It is possible to combine other shielding materials, since the entire outer housing (260) is not subject to the passage of the mineral. Also, in order to absorb any kind of impact, a rubber lining is applied and passive low frequency shock absorbers are used, depending on the behavior of the mineral flow. Optionally, active shock absorbers can be used, which operate from a signal delivered by the container of sensors (270).

Figure 4:
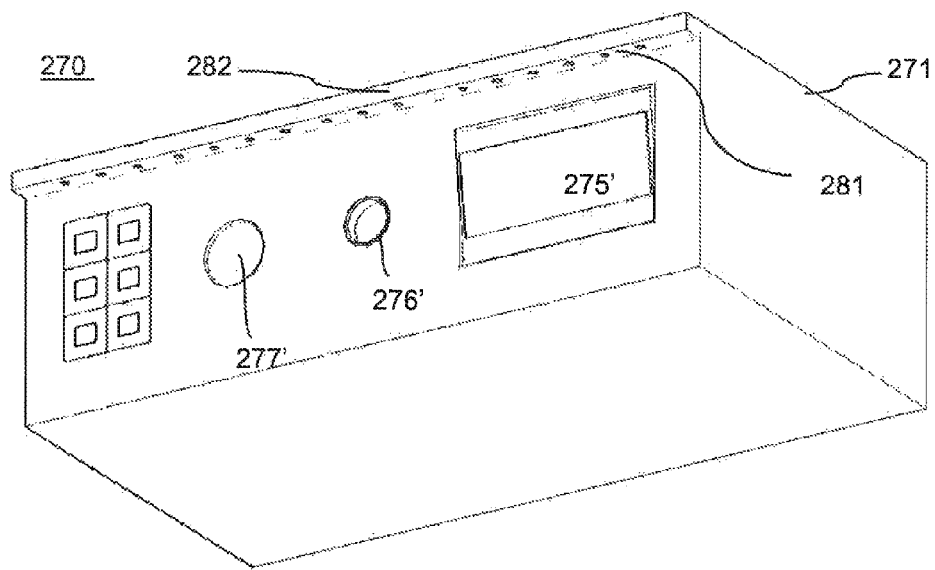
FIG. 4 shows an isometric view taken from the bottom of the unit of sensors being installed on the monitoring unit.
Figure 5:
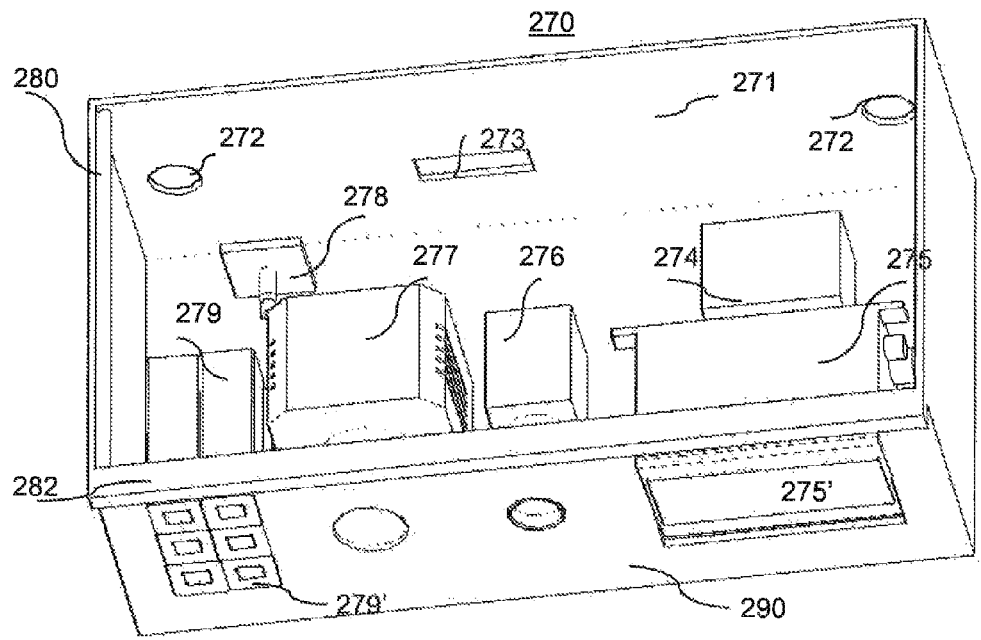
FIG. 5 shows an isometric view taken from the top of the unit of sensors being installed on the monitoring unit.

Inside the outer housing (260) is found a container with sensors (270) shown in FIGS. 4 and 5. Its interior of the container has the sensor means for the monitoring of the interior of the mill (150).

The sensor means which are arranged in the container of sensors (270), comprising a vessel (271) comprise in its interior a laser scanner (275), a thermographic camera (276), a digital camera (277), a plurality of illumination means (279), a thermocouple (278) and a accelerometer (274).

The container of sensors (270) has a face oriented towards the interior of the mill (150). A display panel (290) is on the face and contains perforations with the shape of each element or sensor which are left at a surface level. FIG. 5 shows an example of an arrangement of the elements and sensors. The laser scanner (275) has a scanner opening (275'). The thermographic camera (276) is associated to a thermal opening (276'). The digital camera (277) has an opening (277') and along this photographic camera (277) is located an illumination opening (279'). In FIG. 5, the illumination opening (279') is defined by the arrangement being adopted when the digital camera (277) is calibrated for a better visual approach towards the inside of the mill (150). The illumination means (279) can be arranged at a side, below, above or surrounding the digital camera (277).

The display panel (290) has in its upper part a visor (282) which is hollow and that is integrated into the container of sensors (270) which is internally connected to a clean air duct under pressure (280). The air injected by the air duct under pressure (280) flows through the visor (282) and exits through a plurality of orifices (281), thereby generating a plurality of air jets flowing from the top of the visor (282) towards the bottom, maintaining the external face of the display panel (290) clean and preventing the material of different sensors and illumination means (279) from being embed.

The thermocouple (278) allows sending a temperature signal inside the container of sensors (270) towards the main control unit (250) which provides a command signal for the climate air to enter inside the container of sensors (270) through the openings (272). One of the openings (272) is for the entering and the other one is for exiting the climate air.

The opening (273) allows the exit of the associated cables to the sensors contained inside the container of sensors (270), the control ones as well as the signals and power cables.

The accelerometer (274) allows sending a movement signal of the container of sensors (270) towards the main control unit (250). This signal is to allow the control of active shock absorbers of the monitoring unit (240) when these are used.

Figure 6:
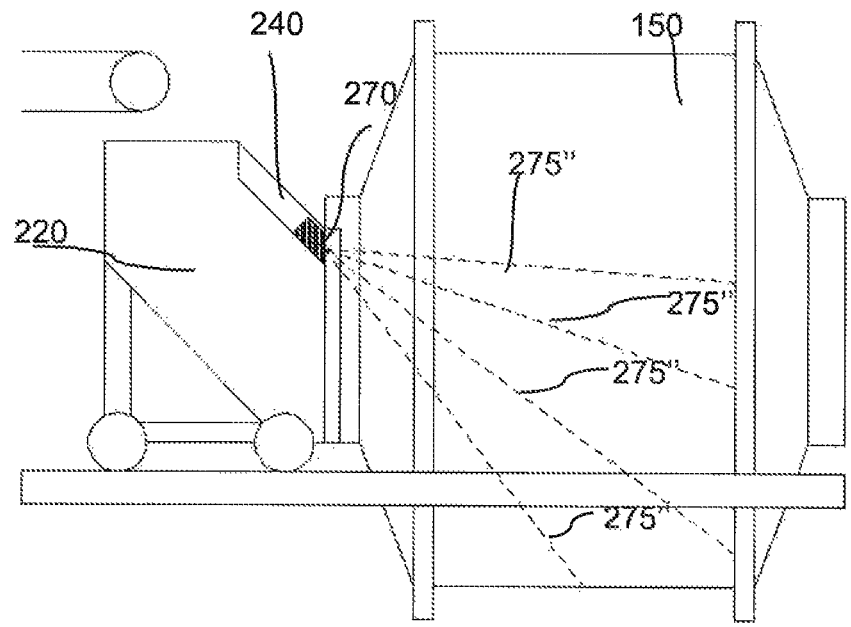
FIG. 6 shows a schematic view of the operation of the sensors inside the mill.

Although FIG. 5 shows only one block the illumination means (279) including six illumination units as an example. It is clear that this plurality of illumination means (279) can be distributed according to the work conditions of each mill (150). FIG. 6 shows an example of the operation of the laser scanner (275) which generates, for instance, four scanning signals (275') to determine the distance and shape of the load inside the mill (150). The schematic view allows to visualize the feed hopper (220) containing in its upper part the monitoring unit (240) and located next to the container of sensors (270).

Figure 7:
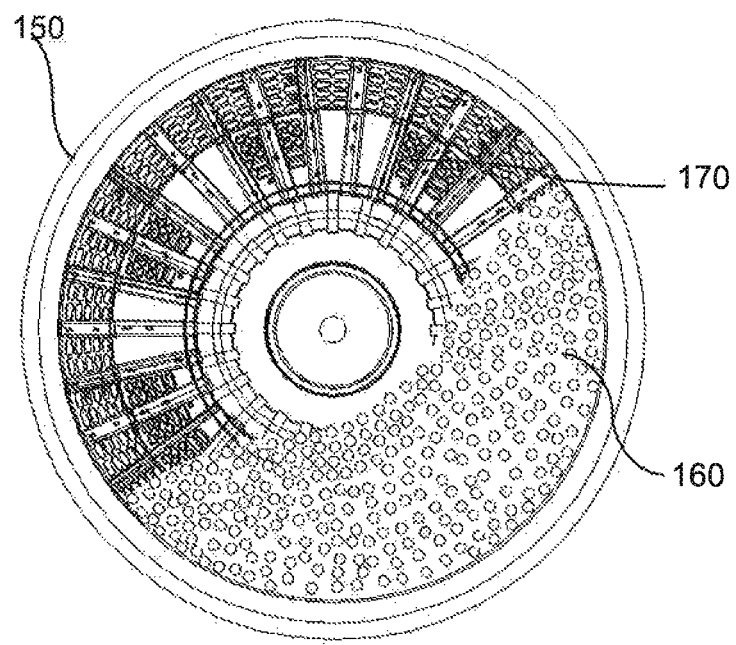
FIG. 7 shows a front view of the interior of the mill from the point where the unit of sensors is located.

FIG. 7 describes a schematic view of the interior of the mill (150) from the display panel (290) which allows determining the shape of the instantaneous load (160), the status of the liners (170) and the thermal profile of the instantaneous load (160) and of the liner (170) of the mill (150).

All monitoring actions can be managed by a user in the operation and management unit (300). However, it is possible to automatically control the results coming from the monitoring unit (240). With such results, the operation and management of the monitoring can be manual or automatic, as the operator may choose.

The thermocouple (278) generates a continuous voltage signal which value is unambiguously related to the temperature which is subject to be determined by the thermocouple to and which corresponds to the interior of the container of sensors (270). This temperature signal is obtained by the main control unit (250) for storing the behavior of the temperature in time and alert in regard to the operation of the mill (150), whether manually or automatically, in relation to the temperature conditions less appropriate for the operation of the rest of the sensors inside the container of sensors (270), and eventually for controlling the conditioning air flow in its interior and maintaining an adequate temperature for the operation of all the sensors located inside the container of sensors (270).

The accelerometer (274) generates a digital signal containing three variables in function of the time, proportional to the acceleration which the accelerometer (274) is subject to on the vertical axis, on the lateral horizontal axis and on the front horizontal axis.

The digital signal combines the three accelerations and is obtained by the main control unit (250) for storing the behavior of the vibration in time while alerting the operation of the mill (150), whether manually or automatically, with regard to the vibration conditions which are not so appropriate for the operation of the rest of the sensors inside the container of sensors (270) and eventually for controlling the rigidity of the active shock absorbers on which the box containing the sensors is supported, thus maintaining an appropriate vibration level for the operation of all sensors inside the container of sensors (270). The digital camera (277) obtains two-dimensional images from the interior of the mill (150) in the visible spectrum through a lens with appropriate optical characteristics for the geometric conditions of the mill (150). The digital camera (277) has appropriate characteristics for the movement speed of the load (160) and mill (150) and for the illumination produced by the illumination means (279). The operation of the digital camera (277) is commanded from the main control unit (250) thereby allowing the obtaining of photographs at a predetermined frequency for the operation of the mill (150). The images captured by the digital camera (277) are automatically stored and processed in the main control unit (250).

In regard to these images, analysis procedures are performed by means of techniques known for measuring dimensions of elements of interest inside the mill (150), for detecting the presence or absence of elements, for detecting the integrity of constituent parts of the liner (170), and for determining the location of the load (160) and the geometric profile of its surface.

In addition, only by submitting the images to the mill's operator (150) on the control and management unit (300), valuable information, which currently is not available, is provided.

The thermographic camera (276) obtains two-dimensional images from the interior of the mill (150) in the thermal spectrum, which implies that the color or tonality of each pixel is related to the temperature of the photographed object.

The capture of these images is performed by a lens having appropriate optical characteristics for the geometric conditions of the mill (150), which in turn, is protected by a window which material has molecular characteristics which makes it particularly permeable to the thermal frequencies, for instance, germanium.

The thermographic camera (276) has appropriate characteristics for the movement speed of the load (160) and mill (150). The operation of the thermographic camera (276) is commanded from the main control unit (250), thereby allowing to obtain thermal images at a predetermined frequency for the operation of the mill (150).

The thermal images captured by the thermographic camera (276) are automatically stored and processed in the main control unit (250). In regard to these thermal images, analysis procedures are performed by known techniques for two purposes: on one hand, the same purposes are followed with the images of the digital camera (277), thereby allowing a redundant measurement in addition to the option of having images in case the illumination means (279) are not in operation. On the other hand, it is desired to identify abnormal thermal gradients in the components pieces of the liner (170) of the mill (150) for early identifying structural failure points. In addition, in the load (160), it is searched for elements of higher temperature in comparison with the rest (steel balls) thus determining the relative quantity of balls according to the mineral quantity.

In addition, only by submitting the thermal images to the operator of the mill (150) on the operation and management unit (300), valuable information, which currently is not available, is provided.

The laser scanner (275) executes the detection of distance in one or more planes by means of the detection of distances, for instance, detection of time of flight, by using laser beams (275") which are moved in angle in time by a mirror rotating at high speed. This allows obtaining one or more three-dimensional profiles of the surrounding in predefined angle positions. The laser beams (275") have characteristics of frequency and power which allow them to penetrate environments of dust and humidity.

The laser scanner operation (275) is commanded from the main control unit (250), allowing to obtain three-dimensional geometric profiles at an appropriate frequency for the operation of the mill (150).

The values in the time of distance and angle of each laser beam (275") generated by the laser scanner (275) are automatically stored and processed in the main control unit (250).

In regard to these laser beams (275"), analysis procedures are performed by known techniques for measuring spatial positions and dimensions of elements of interest inside the mill (150), for detecting the presence or absence of elements, for detecting the integrity of constituent parts of the liner (170), and for determining the location of the load (160), the geometric profile of its surface and its volume.

In addition, only by submitting the three-dimensional geometric profiles measured by the laser scanner (275) to the operator of the mille (150) on the operation and management unit (300), valuable information, which currently is not available, is provided.

Figure 8:
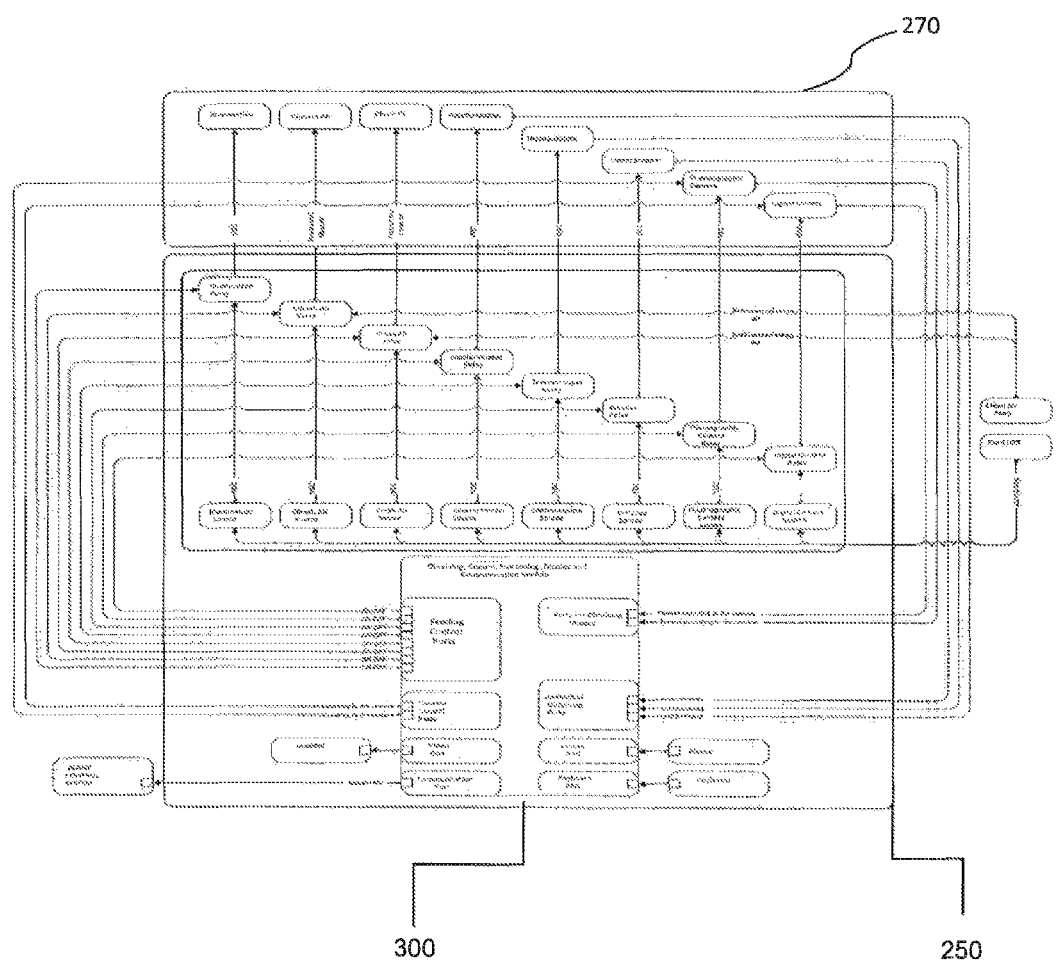
FIG. 8 shows an example of a diagram in blocks of the control and management hardware of the optical monitoring device.

FIG. 8 describes the physical relationship of control and management of the means contained in the container of sensors (270), controlled by the main control unit (250), including sources, valves and relays, for example, as the operating means in the container of sensors (270). The operation and management unit (300) allows the management of the operational means in the container of sensors (270) through the main control unit (250) as described.

The in-line monitoring operating method within a rotary mineral mill or the like, by direct visualization of the load and the inner liner of said mill, is performed through different means contained in the container of sensors (270) as detailed in each function of the sensors.

The operating method comprises the direct visual monitoring for sensing the interior of a mill (150), arranging a monitoring unit (240) which contains in its interior a container of sensors (270) allowing sensing the inner temperature thereof; determining the acceleration on the vertical axis, on the horizontal lateral axis and on the front horizontal axis, according to the time; obtaining two-dimensional images of the interior of the mill (150) by means of a digital camera (277) with regard to the geometric conditions of the interior of the mill (150); obtaining two-dimensional images of the interior of the mill (150) in the thermal spectrum by means of a thermographic camera (276) thereby obtaining thermal images of the interior of the mill (150) executing a detection of distance in one or more planes by means of detection of distances, for instance, detection of the time of flight by using laser beams (275") through a laser scanner (275) in order to obtain one of more three-dimensional geometric profiles of the surrounding in predefined angle positions of the interior of the mill (150).

The invention claimed is:

1. A direct visual monitoring system for sensing an interior of a rotary mineral mill, said system comprising:
    a monitoring unit to be mounted on a discharge zone of a feed hopper of a vessel;
    a main control unit; and
    an operation and management unit, wherein
    the rotary mineral mill is fed from a vessel through the feed hopper, and
    a location of the monitoring unit on the discharge zone of the feed hopper is adjustable according to a dimension of said feed hopper and in accordance with a dimension of the rotary mineral mill, so as to allow for a direct view of the interior of the rotary mineral mill, and
    the monitoring unit is subject to vibrations during loading of the mill and determines a load passing below the monitoring unit, and the monitoring unit comprises an outer housing having a defined shape given by a volume occupied on the feed hopper and protects a container of sensors which are visually oriented towards the inside of the mill.

2. The monitoring system as in claim 1, wherein the outer housing is built with a steel shielding and at least one of a rubber lining for absorbing impact, and passive shock absorbers for absorbing vibrations, and active shock absorbers.

3. The monitoring system as in claim 1, wherein the container of sensors which are visually oriented towards the inside of the mill comprises sensors arranged in said container of sensors, the sensors including at least one of a laser scanner, a thermographic camera, a digital camera, a plurality of illumination means, a thermocouple and an accelerometer.

4. The monitoring system as in claim 3, wherein the thermocouple generates a continuous voltage signal which value is related to a temperature, this temperature signal includes information related to behavior of the temperature in time and alert in regard to operation of the mill, whether manually or automatically, in relation to temperature conditions not so appropriate for the operation of the rest of the sensors inside the container of sensors and for controlling conditioning air flow in its interior and maintaining an adequate temperature for the operation of the sensors located inside the container of sensors through the openings for the climate air to enter and one for the climate air to exit.

5. The monitoring system as in claim 3, wherein the accelerometer generates a digital signal containing variables according to the time, proportional to the acceleration in a vertical axis, a horizontal axis and a front horizontal axis of the mill, said digital signal indicates behavior of the vibration in the vertical axis, the horizontal axis and the front horizontal axis in time and alerting operation of the mill, whether manually or automatically, with regard to vibration conditions for operation of the sensors inside the container of sensors and for controlling rigidity of the active shock absorbers on which the container of sensors is supported, thus maintaining an appropriate vibration level for the operation of the sensors inside the container of sensors.

6. The monitoring system as in claim 1, wherein the laser scanner executes a detection of distance in one or more planes by using laser beams which are moved in angle in time by a mirror rotating at high speed, for obtaining one or more three-dimensional geometric profiles of the surrounding in predefined angle positions, the laser scanner obtains the three-dimensional geometric profiles at an appropriate frequency during operation of the mill, values in the time of distance and angle of each laser beam, generated by the laser scanner, are automatically stored and processed for analysis procedures for measuring spatial positions and dimensions of elements of interest inside the mill, for detecting the presence or absence of elements, for detecting integrity of constituent parts of liner, and/or for determining location of load of a geometric profile of its surface and its volume.

7. The monitoring system as in claim 1, wherein the digital camera obtains two-dimensional images from the interior of the mill in visible spectrum through a lens with appropriate optical characteristics the geometric conditions of the mill, the digital camera has appropriate characteristics for movement speed of load in the mill, and for the illumination produced by the illumination means, the digital camera obtains photographs at a predetermined frequency for the operation of the mill, wherein the images captured by the digital camera are automatically stored and processed to measure dimensions of elements of interest inside the mill, for detecting the presence or absence of elements, for detecting integrity of constituent parts of liner, and/or determining location of load and a geometric profile of its surface.

8. The monitoring system as in claim 1, wherein the thermographic camera obtains two-dimensional images of the interior of the mill in the thermal spectrum, color or tonality of each pixel of the two-dimensional images is related to the temperature of a photographed object, the two-dimensional images are captured by a lens having appropriate optical characteristics for geometric conditions of the mill, the lens is protected by a window made of a thermal frequency permeable material, the thermographic camera obtains thermal images at a predetermined frequency during operation of the mill, the thermal images are automatically stored and processed for analysis procedures allowing a redundant measurement and identifying abnormal thermal gradients in the components pieces of the liner of the mill for identifying structural failure points while searching for in the load elements in comparison with the rest thus determining the relative presence and quantity of steel balls according to mineral quantity.

9. The monitoring system as in claim 3, wherein the container of sensors has a face oriented towards the interior of the mill and has a display panel containing perforations with a shape for each sensor, the perforations including a scanner opening for the laser scanner, a thermal opening for the thermographic camera, an illumination opening for the digital camera, the illumination opening is defined by an arrangement being adopted when the digital camera is calibrated for a better visual approach towards the inside of the mill, illumination means is arranged at a side, below, above or surrounding the digital camera to illuminate the mill.

10. The monitoring system as in claim 9, wherein the display panel has in its upper part a visor which is hollow and that is integrated into the container of sensors, which is internally connected to a clean air duct under pressure; wherein air injected by the air duct under pressure flows through the visor and exits through a plurality of orifices, thereby generating a plurality of air jets flowing from a top of the visor towards a bottom maintaining an external face of the display panel clean, and preventing the sensors and the illumination means from being embed.

* * * * *